Oct. 15, 1957 S. F. MARINO 2,809,858

COMBINED RECORD JACKET AND DISPLAY DEVICE

Filed Feb. 25, 1953

INVENTOR
SEVERINO FRANK MARINO
BY Morton Amster
ATTORNEY

United States Patent Office 2,809,858

Patented Oct. 15, 1957

2,809,858

COMBINED RECORD JACKET AND DISPLAY DEVICE

Severino Frank Marino, New York, N. Y.

Application February 25, 1953, Serial No. 338,697

2 Claims. (Cl. 287—108)

The present invention relates to amusement and educational devices, and particularly to a novel means by which phonograph records may be visually associated with the subject matter of the records during merchandising and playback.

In the educational and entertainment fields, it is known to support animated cutout toys on a platform revolving with a record player for the amusement of children. In this connection, resort has been made to fairly complicated arrangements, usually overlooking promotional values and sales aspects.

Accordingly, it is an object of the present invention to provide a novel promotional package for records facilitating support of cutouts for rotation with the record player which overcome at least the mentioned disadvantages.

It is within the contemplation of the present invention to provide a record jacket attractively illustrated by animated figures or the like related to and identifying the subject matter of the records, and arranged to be punched or cut out from the jackets for association with the record during playback of the record.

As a further feature of the present invention, there is provided a novel support for mounting the animated figures for rotation concurrent with the record being played.

In one aspect the novel support may be fabricated of a further cutout provided in the record jacket, the further cutout being readily assembled by simple means and being particularly advantageous for association with a 45 R. P. M. player. As a further aspect, the support may be a simple yet universal means by which the cutout figures may be associated with the most commonly encountered 33 R. P. M., 45 R. P. M. and 78 R. P. M. players.

The above and still further objects, features and advantages of the present invention will become apparent upon consulting the following detailed description of several illustrative embodiments, when taken in conjunction with the accompanying drawings, wherein.

Figure 3:
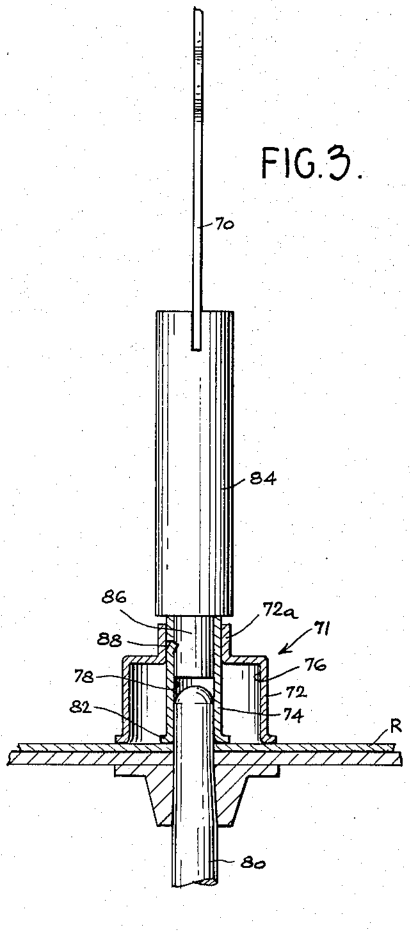
Figure 4:
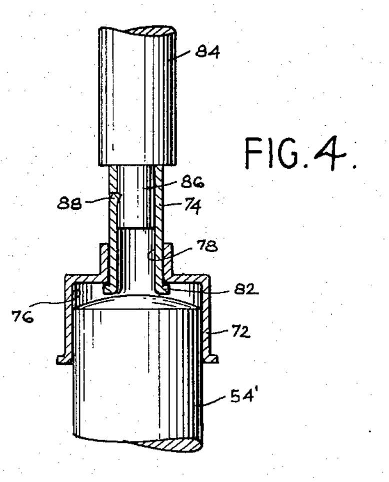
Figure 5:
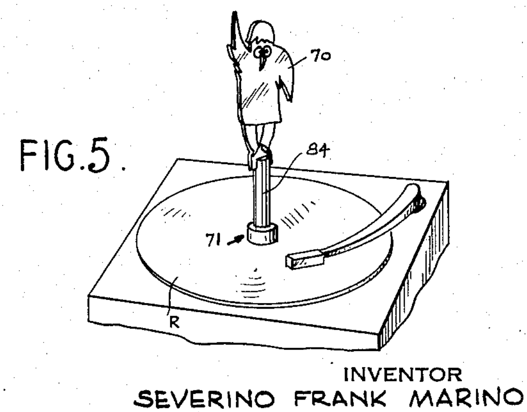

Fig. 3 is a vertical view, with parts broken away and sectioned, showing a universal arrangement for supporting cutouts on a commonly encountered 33 or 78 R. P. M. record player;

Fig. 4 is a fragmentary elevational view similar to Fig. 3 showing the manner of supporting cutouts on a commonly encountered 45 R. P. M. record player; and, Fig. 5 is a perspective view showing a cutout supported on a record player by the universal support illustrated in Figs. 3 and 4.

Figure 1:
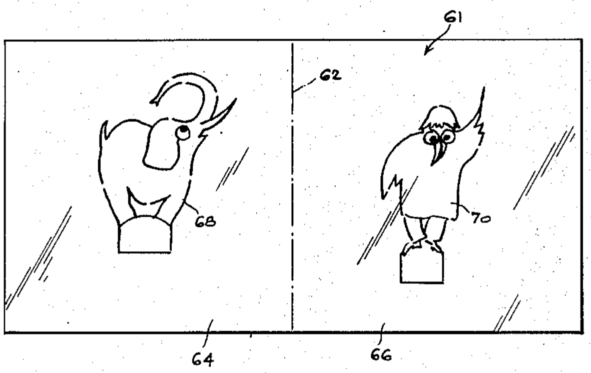
Fig. 1 is a plan view of a further record jacket blank embodying features of the present invention.

Reference will now be made to Fig. 1 wherein there is shown an elongated blank 61 formed with a transverse fold line 62 intermediate the ends thereof subdividing the blank 61 into two panels 64, 66 adjoining at the score line 62. The blank 61 may be folded into an appropriate record jacket, seen in Fig. 2 and joined by glue or stapling.

Figure 2:
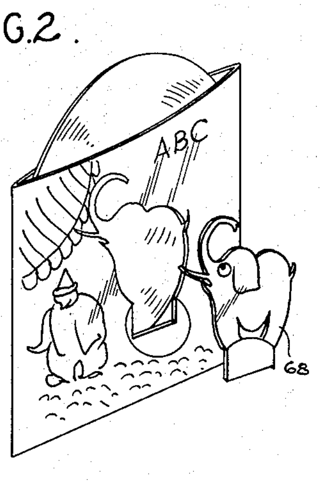
Fig. 2 is an exploded perspective view showing the blank of Fig. 1 formed into a record jacket and partially accommodating a record.

In the blank of Figs. 1 and 2, two flat figures 68, 70 may be associated with the subject matter on opposite sides of the record. This arrangement is specifically contemplated when it is desired to identify both faces of the record R with an appropriate animated character to be supported over the record player during playback of the corresponding side of the record. As seen in Fig. 2 either of the figures 68, 70 which are colored and printed on both sides during the initial processing of the blank 61, may be struck out from the record jacket for mounting. Prior to separation from the blank proper, the figures serve to provide prominent identification for the contents of the jacket.

An appropriate mount for such planar animated figures of Figs. 1 and 2, is the universal attachment 71 arranged to support these animated figures on the most commonly encountered record players, namely the 33 R. P. M. or 78 R. P. M. record player of Fig. 3, or the 45 R. P. M. record player of Fig. 4. The attachment 71, as well as the post 46 may be fabricated of suitable plastics or elastomers. Specifically, the attachment 71 consists of a pair of concentrically arranged seating members 72, 74, the outermost seating member 72 having a bore 76 commensurate in cross-section with the cross-section of the 45 R. P. M. spindle 54' of Fig. 4, and the innermost seating member 74 having a bore 78 commensurate in cross-section with the spindle 80 of Fig. 3. The outermost seating member 72 is provided with a guide sleeve or neck 80 conformed about and guidingly engaging the inner seating member, the latter being axially displaceable relative to the outer seating member 72. The lowermost end of the inner seating member 74 is provided with an outwardly turned stop or flange 82 to limit the upward displacement of the seating member 74. If necessary, the uppermost end of the seating member may also be formed with a similar flange or stop.

Supported in end-to-end alignment with the inner sleeve member 74 is an upright 84 having a depending pin part 76 which is force-fitted into the inner seating member 74 and preferably fixed thereto, as for example, by striking an ear 88 inwardly from the sleeve member 74. The uppermost end of the upright 84 is provided with a slot of a width sufficient to accommodate the cutout, for example the elephant animation 68, shown removed from the blank proper 60 in Fig. 2.

The package of Figs. 1 to 5 inclusive would be employed in substantially the following manner:

The jacket of Fig. 2, provided with appropriate figures corresponding to the subject matter on the opposite sides of the record, is merchandised with the attachment 70. If a standard or long-playing machine, having the small central spindle is to be employed, the innermost seating member 74 is engaged over the spindle 80, as shown in Fig. 3, with the outermost seating member 72 inoperative and resting on the underlying record. In the event that the character is to be supported on a 45 R. P. M. machine of the type illustrated in Figs. 4 and 5, the innermost seating member 74 is upwardly displaced to the limit fixed by the stop 82, so that the outermost sleeve member 72 can be fitted over the upright post 54'.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

What I claim is:

1. A device for attachment of animated figures to record players having rotatable spindles of smaller and larger standard sizes, comprising a first seating member dimensioned to be complementary to and embracingly engage rotatable spindles of said smaller standard size, a second seating member dimensioned to be complementary to and embracingly engage rotatable spindles of said larger standard size, means interconnecting said seating members for longitudinal displacement relative to each other with said first seating member arranged within said second seating member, said first seating member being longitudinally movable to a retracted position relative to said second seating member when the latter is to be used, and support means carried by one of said seating members and arranged to mount an animated figure thereon.

2. A device for attachment of animated figures to record players having rotatable spindles of smaller and larger standard sizes comprising a first seating member which is circular in cross-section and dimensioned to be complementary to and embracingly engage the rotatable spindles of said smaller standard size, a second seating member which is circular in cross-section and dimensioned to be complementary to and embracingly engage the rotatable spindles of said larger standard size, means interconnecting said seating members for limited longitudinal displacement relative to each other with said first seating member arranged within said second seating member, said first seating member being longitudinally movable to a retracted position relative to said second seating member when the latter is to be used, and support means carried by said first seating member and arranged to mount an animated figure thereon, said support means being adapted to mount the animated figure when either said first or second seating members is embracingly engaged with the appropriately sized rotatable spindle.

References Cited in the file of this patent

UNITED STATES PATENTS

| | | |
|---|---|---|
| 900,877 | Norcross | Oct. 13, 1908 |
| 1,170,325 | Poposkey | Feb. 1, 1916 |
| 1,615,749 | Foster | Jan. 25, 1927 |
| 2,636,312 | Martin | Apr. 28, 1953 |

FOREIGN PATENTS

| | | |
|---|---|---|
| 607,016 | Great Britain | Aug. 24, 1948 |